(12) United States Patent
Müller et al.

(10) Patent No.: US 8,317,240 B2
(45) Date of Patent: Nov. 27, 2012

(54) BUMPER FOR A MOTOR VEHICLE

(75) Inventors: Oliver Müller, Paderborn (DE); Burkhard Röper, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 286 days.

(21) Appl. No.: 12/696,429

(22) Filed: Jan. 29, 2010

(65) Prior Publication Data
US 2010/0194127 A1    Aug. 5, 2010

(30) Foreign Application Priority Data

Jan. 29, 2009  (DE) .................. 10 2009 006 609

(51) Int. Cl.
*B60R 19/34* (2006.01)
(52) U.S. Cl. .................. 293/132; 293/155; 293/133
(58) Field of Classification Search ............. 296/187.9; 293/133, 155, 132, 102
See application file for complete search history.

(56) References Cited

U.S. PATENT DOCUMENTS

| | | | | |
|---|---|---|---|---|
| 3,930,665 | A * | 1/1976 | Ikawa ........................... | 280/751 |
| 6,349,521 | B1 | 2/2002 | McKeon et al. | |
| 6,966,602 | B2 * | 11/2005 | Mae .......................... | 296/187.03 |
| 7,066,509 | B2 * | 6/2006 | Kollaritsch et al. ........... | 293/133 |
| 7,399,013 | B2 * | 7/2008 | Lutke-Bexten et al. ...... | 293/102 |
| RE40,736 | E * | 6/2009 | Heatherington et al. ..... | 293/102 |
| 8,020,907 | B2 * | 9/2011 | Wibbeke et al. .............. | 293/133 |
| 8,079,624 | B2 * | 12/2011 | Roll et al. ...................... | 293/102 |
| 2006/0249962 | A1 * | 11/2006 | Gonzalez et al. ............. | 293/133 |
| 2006/0290150 | A1 | 12/2006 | Roll et al. | |
| 2009/0066095 | A1 * | 3/2009 | Karlander ..................... | 293/102 |
| 2009/0236866 | A1 * | 9/2009 | Lee ................................ | 293/132 |
| 2009/0267368 | A1 * | 10/2009 | Hashimura ................... | 293/132 |
| 2011/0254295 | A1 * | 10/2011 | Cave et al. .................... | 293/132 |

FOREIGN PATENT DOCUMENTS

| | | |
|---|---|---|
| DE | 101 35 903 A1 | 2/2003 |
| DE | 102 06 011 A1 | 8/2003 |
| EP | 1 736 369 A2 | 12/2006 |
| EP | 1 730 002 B1 | 9/2007 |
| EP | 2 082 924 A1 | 7/2009 |
| WO | WO 98/11267 | 3/1998 |
| WO | WO 2008/147276 | 12/2008 |

* cited by examiner

*Primary Examiner* — Glenn Dayoan
*Assistant Examiner* — Pinel Romain
(74) *Attorney, Agent, or Firm* — Henry M. Feiereisen, LLC

(57) ABSTRACT

A bumper for a motor vehicle has a cross member disposed transversely in relation to side rails of a vehicle frame and is supported on the side rails by crash boxes. The cross member includes a central longitudinal section having opposite ends, a crash box attachment section with a substantially vertical rear wall and two legs, and an end section having in cross-section a U-shaped configuration defined by two legs and a web which interconnects the legs and forms an outward-projecting bulge. The bulge is joined with the substantially vertical rear wall of the attachment section.

8 Claims, 3 Drawing Sheets

BUMPER FOR A MOTOR VEHICLE

CROSS-REFERENCES TO RELATED APPLICATIONS

This application claims the priority of German Patent Application, Serial No. 10 2009 006 609.8, filed Jan. 29, 2009, pursuant to 35 U.S.C. 119(a)-(d), the content(s) of which is/are incorporated herein by reference in its entirety as if fully set forth herein.

BACKGROUND OF THE INVENTION

The present invention relates to a bumper for a motor vehicle.

The following discussion of related art is provided to assist the reader in understanding the advantages of the invention, and is not to be construed as an admission that this related art is prior art to this invention.

Bumpers are provided as standard equipment on both the front and the rear of motor vehicles to absorb the impact energy caused by minor impacts and to prevent or minimize damage to the actual structural support of the motor vehicle. A bumper typically includes a cross member which can be attached transversely to the side rails by way of crash boxes. The function of the cross member is to tranfer the energy resulting from an impact into the crash boxes, where the impact energy is converted into deformation energy. The system is here matched such that the crash boxes are located close to the center on the side rail of a motor vehicle, with the impact energy being transferred to the crash boxes and hence to the side rails via the cross member with minimal bending moment.

Various bumpers of different designs are known in the art. For example, U.S. Pat. No. 6,349,521 B1 discloses a bumper with a rigid hollow cross member. The cross-section of the cross member varies along its length so as to provide high energy absorption commensurate with the load.

EP 1 730 002 B1 discloses a bumper with a cross member having a U-shaped longitudinal profile that is closed off with a cover plate. EP 1 736 369 A2 also discloses a saucer-type cross member.

DE 102 06 011 A1 and DE 101 35 903 A1 disclose cross members provided with indentations in the attachment regions with the crash boxes, wherein the indentations engage in the open ends of the crash boxes. The intent is here to provide transverse stability to the cross member.

Bumpers must satisfy regulatory requirements as well as demands from consumer protection agencies aimed at protecting pedestrians. In addition, requirements from the classification tests of insurers (RCAR, GDV) must be satisfied. The automobile manufacturers typically also require optimal utilization of the installation space, ease of installation, high energy absorption capability and lowest possible weight as well as acceptable costs. In addition, the goal of reducing $CO_2$-emission requires a consequent implementation of lightweight construction in vehicle design. However, the required weight reduction and the insurance classification tests tend to contradict one another.

It would therefore be desirable and advantageous to address this problem and to obviate other prior art shortcomings by providing a fully functional bumper which is lightweight and has an improved loading capacity.

SUMMARY OF THE INVENTION

According to one aspect of the present invention, a bumper for a motor vehicle has a cross member which is attached to longitudinal side rails of the vehicle frame by way of crash boxes. The cross member has a center longitudinal section and ends, which are connected to a corresponding crash box attachment section and an end section. Each crash box attachment section has a U-shaped configuration and a substantially vertical real wall and an upper and a lower leg. The end sections also have a U-shaped cross-section defined by a web and two legs. According to the invention, each web of an end section connects into the rear wall of a crash box attachment section by forming a bulge, which improves the loading characteristic and, in particular, increases the stiffness of the cross member in the region where the cross member is attached to the crash boxes. The impact energy is transmitted to the crash box by way of the cross member with a small bending moment. Due to the increased stiffness, the profile depth of the cross member can be reduced in the outer region, i.e., in the end sections. In addition, the wall thickness of the cross member can be reduced. Altogether, a bumper with an improved loading capacity can be implemented in lightweight construction with optimal weight.

Advantageously, the bulge projects outward in the direction to the crash box. The web of the end sections is altogether rounded, particularly over the vertical height. This measure also increases the stiffness characteristic and the energy absorption capacity of the bumper.

The bulge is constructed so as to have a greater width than the web of the end section. Preferably, the bulge has a rounded or drop-shaped contour.

According to one advantageous embodiment of the invention preferred in practical applications, the center longitudinal section of the cross member has also a U-shaped cross-sectional configuration with a web and two legs. The crash box attachment sections have greater widths than the center longitudinal section and the end sections and are also deeper. The vertical height of a crash box attachment section is greater than the vertical height of the web in the center longitudinal section.

According to yet another embodiment of the invention, outwardly oriented front webs connect from the free ends of the legs of the end sections and/or the crash box attachment sections and/or the center longitudinal section.

The cross member is constructed as a single saucer-shaped or U-shaped piece and is preferably made of sheet steel. The web(s) of the cross member is/are arranged on the side of the bumper facing the motor vehicle. The front side of the cross member is closed off with a cover plate, which is joined to the front webs. The joints can be implemented as spot joints and prepared by, for example, spot welding, punch-riveting or similar joining techniques. Preferably, the cover plate is connected to the front webs with an adhesive. In this way, a further reduction in weight and increase in stiffness can be attained. This measure provides additional benefits in that the adhesive layer has an insulating function and prevents contact corrosion between the cross member and the cover plate. The use of non-galvanized sheet metal, in particular hot-formed and hardened steel profile, now becomes possible or is at least made easier. Advantageously, use of an adhesive is favored for connecting a cross member and a cover plate made from a lightweight metal, for example sheet aluminum, or from a combination of different materials, for example, when the cross member is made of sheet steel and the cover plate is made of a lightweight metal.

In another advantageous embodiment, the rear wall of a crash box attachment section may have an opening which may be used, for example, to insert a towing lug into a lug attachment unit arranged inside the crash box.

In addition, the vertical height of the web of the center longitudinal section can vary. In particular, the web can be higher and wider at the center of the center longitudinal section than in the regions adjacent to the attachment sections. Moreover, regions of the front sections in the center longitudinal section may have chamfers. The chamfers are also provided in the center of the center longitudinal section, thereby increasing the stiffness and the loading characteristic in this region.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
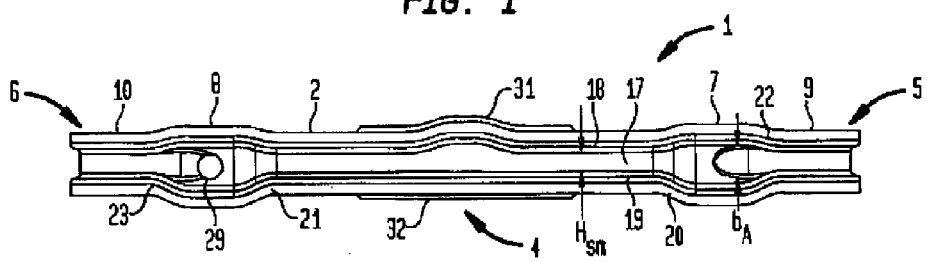
FIG. 1 is a front view on the cross member of a bumper without a cover plate according to the present invention.

Throughout all the Figures, same or corresponding elements may generally be indicated by same reference numerals. These depicted embodiments are to be understood as illustrative of the invention and not as limiting in any way. It should also be understood that the Figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
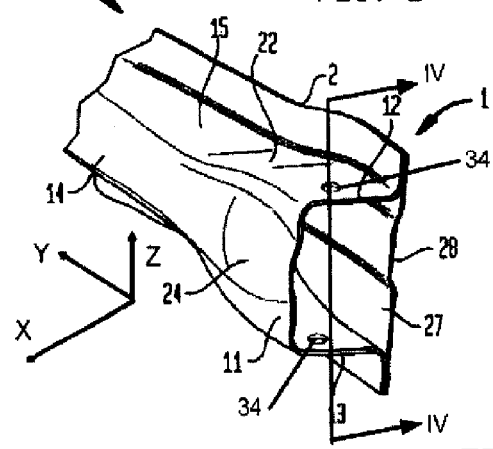
FIG. 2 shows in a perspective view a detail from the right end of the cross member according to FIG. 1 with a cover plate.
Figure 4:
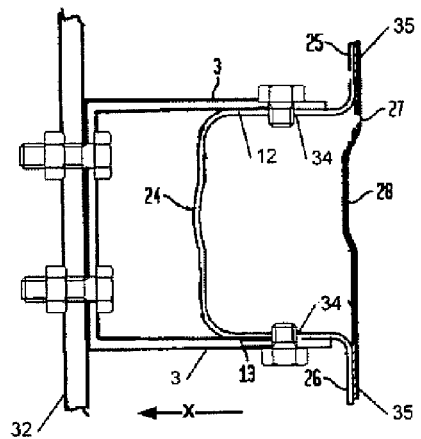
FIG. 4 represents a cross-section of the diagram taken along the line IV-IV of FIG. 2 with a schematically indicated crash box that is attached to a schematically indicated frame member of a motor vehicle.
Figure 10:
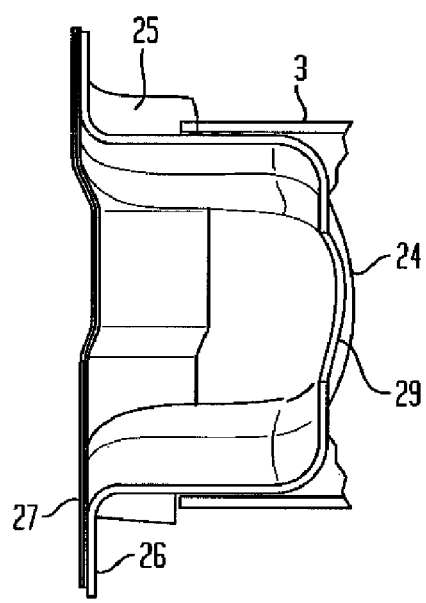
FIG. 10 represents the diagram of FIG. 8 in a side view with a schematically indicated crash box.

Turning now to the drawing, and in particular to FIG. 1, there is shown a bumper 1 for a motor vehicle according to the invention. The bumper 1 includes a cross member 2 which can be attached to a side rail of a motor vehicle (schematically shown as element 32 in FIG. 4). The Cartesian coordinate system shown in FIG. 2 illustrates the x-axis pointing in the direction of the motor vehicle, the y-axis pointing to the longitudinal direction of the cross member 2, and the z-axis aligned with the vertical width of the cross member 2. The cross member 2 is attached to the side rails by way of crash boxes 3 which are schematically indicated in FIGS. 4 and 10. The crash boxes 3 are provided to absorb, in addition to cross member 2, the energy resulting from an impact by converting the energy into deformation energy.

Figure 3:
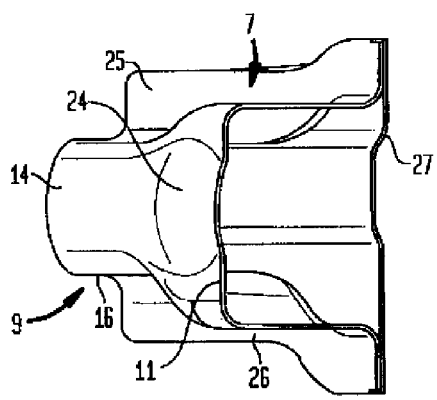
FIG. 3 shows the detail of FIG. 2 in a different perspective view.
Figure 5:
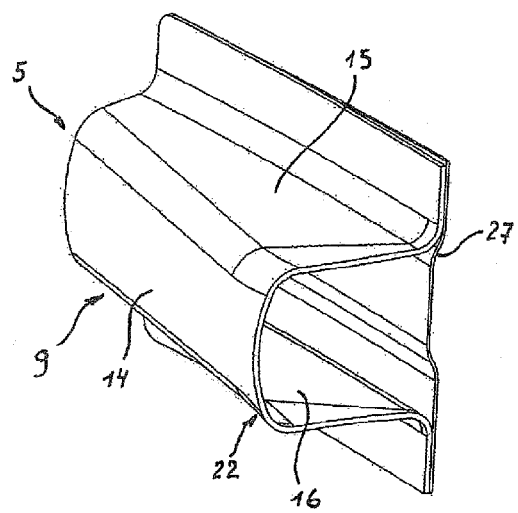
FIGS. 5 to 7 show three different details of an end section in different perspective views.
Figure 7:
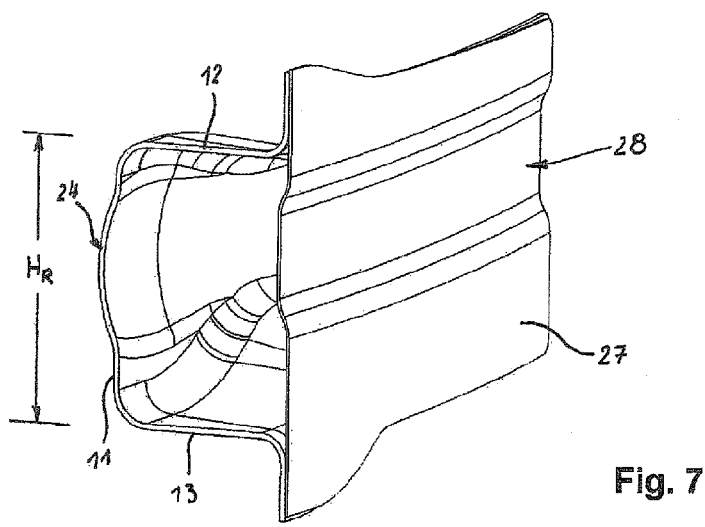
Figure 8:
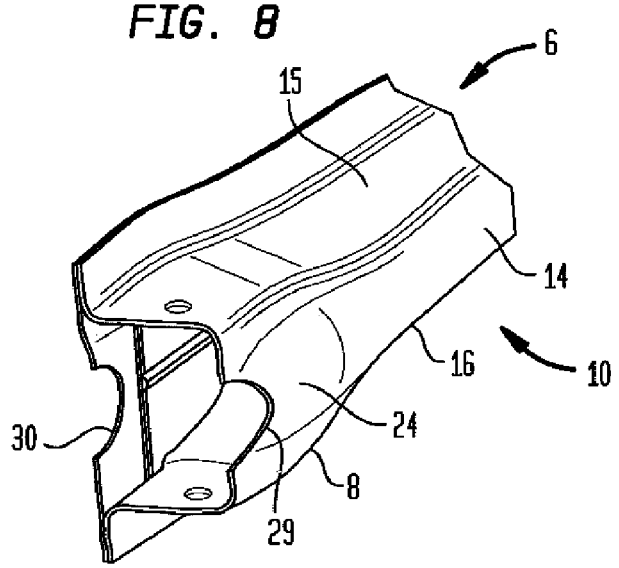
FIG. 8 shows in a perspective view a detail of the left end of the cross member according to the FIG. 1 with a cover plate.
Figure 9:
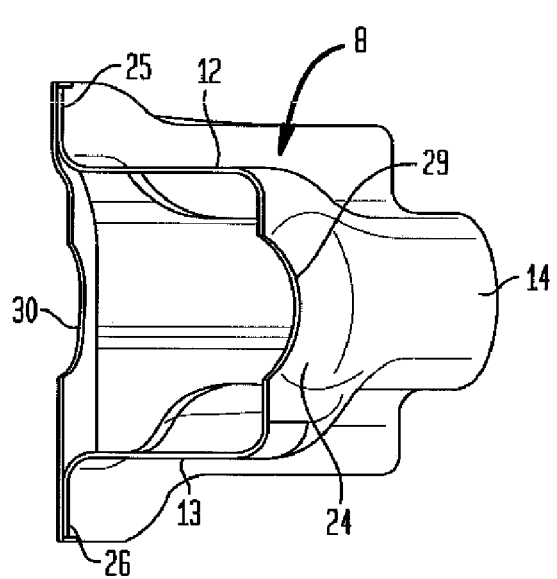
FIG. 9 shows the detail of FIG. 8 in a different perspective view.

The cross member 2 is formed in one piece from sheet metal, in particular sheet steel, and has an altogether saucer-shaped or U-shaped configuration. The cross member 2 has a center longitudinal section 4 with two ends 5, 6, with a corresponding crash box attachment section 7, 8 and an end section 9, 10 being attached to the two ends 5, 6, in that order. As illustrated in FIGS. 2 and 3, the crash box attachment sections 7, 8 are U-shaped and have a substantially vertical rear wall 11 which is connected to an upper leg 12 and a lower leg 13 (see also, for example, FIGS. 4, 7 and 9). The rear wall 11 faces the motor vehicle. Accordingly, the legs 12, 13 face away from the motor vehicle. The upper leg 12 and the lower leg 13 may each have openings 34 for attachment of crash boxes 3, for example with screws, as illustrated for example in FIG. 4. The end sections 9, 10 also have a U-shaped cross-section and in addition a web 14, as well as two forward facing legs 15, 16 (see also FIGS. 5 and 8).

The center longitudinal section 4 also has a U-shaped cross-section with a web 17, an upper leg 18 and a lower leg 19. The center longitudinal section 4 transitions via widening transition sections 20, 21 to corresponding crash box attachment sections 7, 8. The vertical height $H_R$ of the rear wall 11 of a crash box attachment section 7, 8 is greater than the vertical height $H_{Sm}$ of the web 17 in the center longitudinal section 4.

Figure 6:
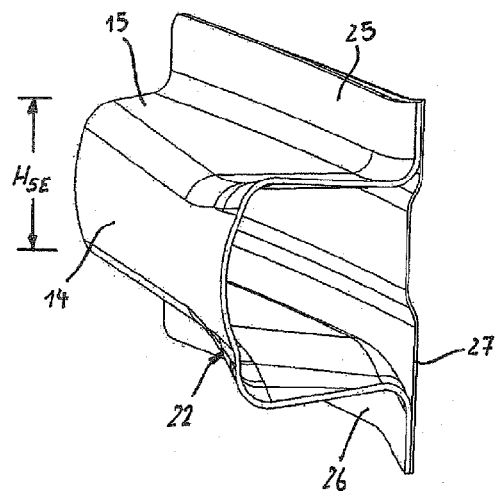

The webs 14 of the end sections 9, 10 are rounded along their vertical height and curved towards the motor vehicle. The end sections 9, 10 are also curved along the length of the cross member 2, with the width of each leg 15, 16 increasing from the respective end 5, 6 to the corresponding crash box attachment sections 7, 8 (see FIGS. 5 to 7).

The crash box attachment sections 7, 8 are configured in form of consoles. Each end section 9, 10 transitions by way of a transition section 22, 23 into a widened crash box attachment section 7, 8. The webs 14 of the end sections 9, 10 are connected with the rear wall 11 of a crash box attachment section 7, 8 through the formation of a bulge 24. The bulge 24 is rounded and projects outwardly towards the motor vehicle or towards the crash box 3. The width $b_A$ of the bulge 24 is greater or wider than the height $H_{SE}$ of the web 14 of an end section 9, 10.

The structure of the web 14 and its transition into the bulge 24 results in a corrugation-like reinforcement in the region of the end section 9, 10 and of the crash box attachment sections 7, 8, which can improve the loading characteristic of the cross member 2. With the increased stiffness, the profile depth of the cross member 2 in the end sections 9, 10 can be reduced. In addition, the wall thickness of the cross member 2 can be reduced in comparison to conventional designs.

Outwardly oriented front webs 25, 26 are extend from the front or free ends of the legs 15, 16 of the end sections 9, 10 and the legs 12, 13 of the crash box attachment sections 7, 8, as well as the legs 18, 19 of the center longitudinal segment 4. The front webs 25, 26 extend over the entire length of the cross member 2.

As shown in FIGS. 3 to 7 and FIG. 10, the front side of the cross member 2 is closed off by a cover plate 27 which is joined with the front webs 25, 26, in particular with an adhesive 35. The cover plate 27 further increases the stiffness of the bumper 1.

Connecting the cross member 2 and cover plate 27 with an adhesive further reduces the weight and increases the stiffness. In addition, the adhesive layer insulates the front webs 25, 26 and the cover plate which can reduce contact corrosion. This simplifies or makes possible the use of non-galvanized sheet metal and/or hot-formed profiles.

As illustrated, for example in FIGS. 2 to 7, the cover plate 27 has a depression 28 facing the interior of the cross member 2. This corrugation-like shape of the material additionally increases the stiffness of the cover plate 27 and of the bumper 1 in general.

FIG. 1 and FIGS. 8 to 10 further illustrate openings 29, 30 disposed in the rear wall 14 of the crash box attachment section 8 and, perpendicular thereto, also in the cover plate 27. These openings are provided for insertion of a towing lug in a lug attachment unit (not shown) disposed inside the crash box 3.

FIG. 1 also shows that the web 17 of the center longitudinal section 4 has a varying height. The vertical height $H_{Sm}$ of the web 17 is greater at the center of the cross member 2 than near the crash box attachment sections 7, 8. Moreover, chamfers 31, 32 are provided on the front webs 25, 26 in the center of the center longitudinal section 4, wherein the chamfers 31, 32 face away from the front webs 25, 26 towards the web 17 of the center longitudinal section 4.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A bumper for a motor vehicle, comprising:
   a cross member having
     a central longitudinal section and two end sections, wherein at least portions of the central longitudinal section and the two end sections have a substantially identical a U-shaped first cross-section with a first web having a first width and two first legs having a first length,
     crash box attachment sections, each crash box attachment section arranged intermediate between an end of the central longitudinal section and a respective end section and having a U-shaped second cross-section with a second web and two second legs, wherein a width of the second web and a length of the second legs are greater than a width of the first web and a length of the first legs, said central longitudinal section, the crash box attachment sections and the respective end sections continuously transitioning into each other,
   a cover plate extending continuously longitudinally over a full length of the cross member and being joined to free ends of the first and second legs for increasing stiffness of the bumper, and
   crash boxes attached exterior to the second legs of corresponding crash box attachment sections and facing away from the cover plate towards the motor vehicle for attachment to the motor vehicle.

2. The bumper of claim 1, wherein the web of the end sections each form a rounded bulge projecting outward toward the crash box.

3. The bumper of claim 1, wherein the web of the end sections is rounded in a vertical direction.

4. The bumper of claim 1, wherein the legs of at least one of the end sections, the attachment section and the central longitudinal section of the cross member comprises outwardly oriented front webs, and wherein the cover plate is joined to the front webs.

5. The bumper of claim 4, wherein the cover plate is joined to the front plate with an adhesive.

6. The bumper of claim 1, wherein the second web of the attachment section has an opening configured for insertion of a towing lug.

7. The bumper of claim 1, wherein the first web in the central longitudinal section has a varying vertical height.

8. The bumper of claim 1, wherein the cover plate comprises a longitudinally extending depression facing the first and second webs for increasing stiffness of the cover plate.

* * * * *